J. CONEY.
Carriage Wheel.
No. 87,823.   Patented March 16, 1869.
Fig: 1.
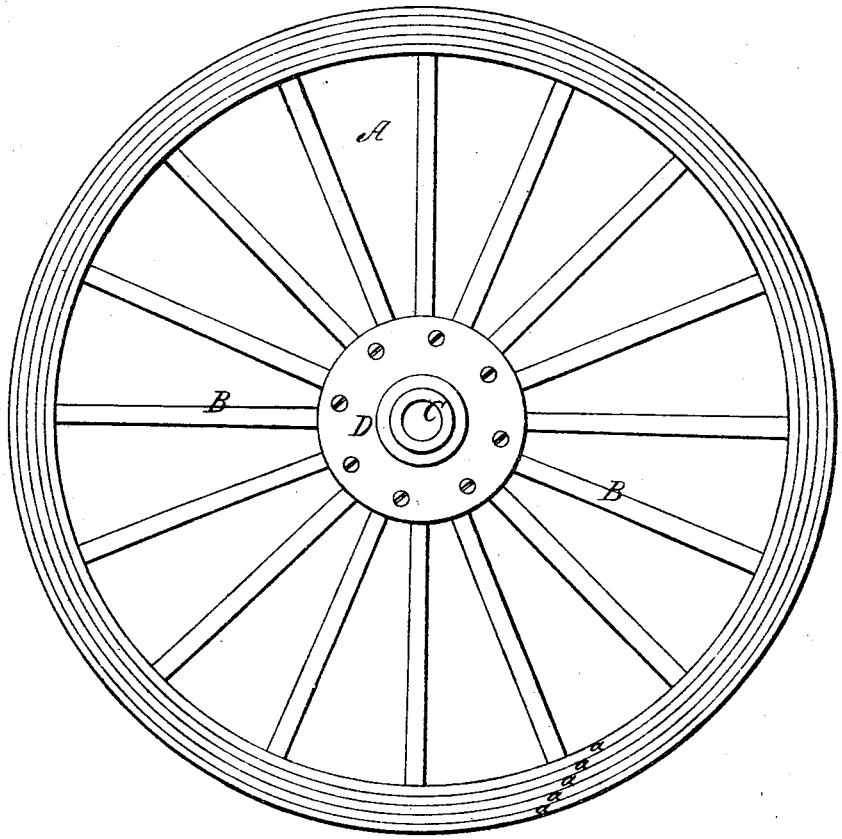
Fig: 2.
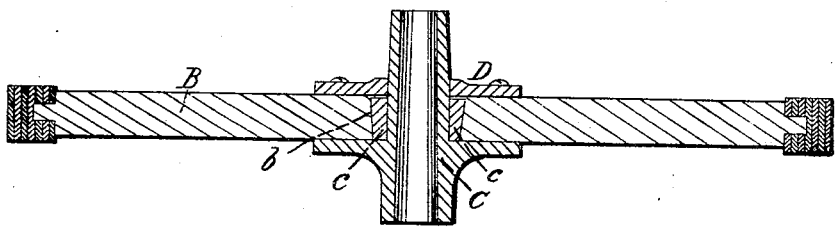
Witnesses.
Jabez Coney
by his attorney

United States Patent Office.

JABEZ CONEY, OF SOUTH BOSTON, MASSACHUSETTS.

Letters Patent No. 87,823, dated March 16, 1869.

IMPROVED CARRIAGE-WHEEL.

The Schedule referred to in these Letters Patent and making part of the same.

*To whom it may concern:*

Be it known that I, JABEZ CONEY, of South Boston, in the county of Suffolk, and State of Massachusetts, have invented certain new and useful Improvements in the Manufacture of Wheels for Carriage and other Purposes; and I hereby declare the following to be a full, clear, and exact description of the same, reference being had to the accompanying drawings, in which—

Figure 1 is a perspective view of a wheel made in accordance with my invention, and Figure 2 is a transverse section of the same, through the hub.

My invention relates, first, to the formation of the rim of a carriage, or other wheel; and, secondly, to the method of securing the spokes of the wheel; and My invention may be stated to consist, first, in forming the rim of a strip or strips of wood, of suitable dimensions, as hereinafter described, wound around a form, or arbor, of the required shape, until the rim shall have attained the desired size, or thickness, the successive folds of the strip being united by glue or cement, or like means, as they are laid upon each other.

The object I have in view in this part of my invention is to obtain a rim which shall possess greater strength and durability, and which, at the same time, may be manufactured with greater ease and less expense than is practicable by the ordinary method of manufacture.

The felloes of an ordinary wheel depend, for their strength, in great measure, upon the iron tire; and so, too, when the rims of light wheels are bent from one piece, they also depend upon the tire for their strength, and always are weak and liable to give out at the joint where the two ends come together. By the method, however, which I employ, a rim is produced which in itself, and without any tire, is of great strength, and with which a tire of much less weight than ordinarily employed, can successfully be used.

In order that this portion of my invention may be more fully understood, I will proceed to describe one manner in which the same is or may be carried into effect.

I first ascertain, by actual experiment, the greatest thickness which the strip of wood, when well seasoned, can have, so as to make a perfect joint when bent over a form of any given diameter.

For example, the internal diameter of the wheel A, in the drawings, is seven inches, and to bend the strips, *a*, of wood, white ash, for instance, so as to form a circle having this diameter, the strip or strips cannot safely be over one-sixteenth of an inch thick.

Having, therefore, cut a strip, of the thickness required, or two or more strips, depending upon the length of the timber from which the strips are cut, and the thickness to be given to the rim, or ring, the strip or strips, after having been scarfed, or spliced together, and cemented, and the joints dried, are then wound upon a suitable arbor, or form, in successive folds *a*, as indicated in fig. 1.

The free end of the strip which is in process of winding, is weighted, or the strip, as it passes to the arbor on which it is wound, is run between rolls, weighted to nearly the tensile strength of the strip, thus insuring a close contact between the folds *a*, and the consequent solidity of the rim; and at the same time, a glue or cement of suitable nature, such, for instance, as pure white lead and linseed-oil, mixed, is applied between the folds, so as to unite them together tightly and securely. In this manner I am enabled to make a very strong ring, or carriage-wheel rim, cheaply and quickly.

The stuff, or material costs less than ordinary felloes, for it may be cut from timber which cannot be employed for making the latter; and as the thickness of the strips will not, in general, exceed one-fourth of an inch, they may be thoroughly seasoned in a short time; and there are no joints in the rim, the whole being solid, and as strong at the scarfs, where the strips are united, as elsewhere.

After the rim has attained the desired thickness, it can be turned or cut to a true shape, and to the precise size required, and if it is to be used as a carriage-wheel, it may have applied to it a metal tire, which, owing to the strength of the annular rim, may be of much less weight than is required with ordinary wheels.

The second part of my invention, which, as above stated, relates to the method of securing and tightening the spokes against the rim, consists of the combination, with the hub and spokes, of a wedge-shaped, or tapering annulus, or ring, arranged within the hub, so as to bear against the converging ends, and force the spokes outward against the rim of the wheel.

This portion of my invention will be readily understood by reference to fig. 2.

The inner ends, *b*, of the spokes B, are inserted in the hub C, in any suitable manner, and are bevelled so as to have an inclination corresponding to that of the tapering ring *c*. They should also be of parallel width and thickness where they enter the hub.

In the wheel shown in the drawings, the mortises formed in the hub are open on one side, so as to admit the spokes from the side of the hub, the latter being then held in place by the plate, or cheek D, which is attached to the hub by bolts or other suitable means.

The tenons on the outer ends of the spokes, and the mortises in the rim, are so formed, that not only the shoulders of the tenons, but also the ends of the spokes, may bear against the rim.

After the spokes are thus put in from the inside of the rim, the wedge-shaped, or tapering ring C, of suitable size and dimensions, is driven in between the hub and the ends of the spokes, and the latter are thus driven forcibly outward against the rim, giving the wheel increased strength and solidity.

After the ring has been driven in, the plate D is fastened on, and the wheel is complete.

Having now described my invention, and the manner in which the same is or may be carried into effect,

What I claim, and desire to secure by Letters Patent, is—

Forming the rim of a carriage, or other wheel, of a strip or strips of wood, wound in successive folds, or layers, around a block, or arbor, of the required size, substantially as herein described, said folds being united by glue, cement, or like means, as they are laid upon each other, as set forth.

In testimony whereof, I have signed my name to this specification, before two subscribing witnesses.

JABEZ CONEY.

Witnesses:
 GEORGE W. ELLIS,
 BERNARD JENNY.